United States Patent
Lawrance

(10) Patent No.: US 9,495,342 B2
(45) Date of Patent: Nov. 15, 2016

(54) SYSTEM AND METHOD FOR AUTOMATICALLY INSERTING CORRECT ESCAPING FUNCTIONS FOR FIELD REFERENCES IN A MULTI-TENANT COMPUTING ENVIRONMENT

(71) Applicant: salesforce.com, inc., San Francisco, CA (US)

(72) Inventor: Steven Lawrance, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 254 days.

(21) Appl. No.: 14/019,395

(22) Filed: Sep. 5, 2013

(65) Prior Publication Data
US 2014/0068416 A1 Mar. 6, 2014

Related U.S. Application Data

(60) Provisional application No. 61/697,047, filed on Sep. 5, 2012.

(51) Int. Cl.
*G06F 17/00* (2006.01)
*G06F 17/24* (2006.01)
*G06F 17/22* (2006.01)

(52) U.S. Cl.
CPC ............ *G06F 17/24* (2013.01); *G06F 17/2217* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,353,839 B1 * | 3/2002 | King ................... | G06F 17/2247 715/236 |
| 6,367,077 B1 | 4/2002 | Brodersen et al. | |

(Continued)

*Primary Examiner* — Keith Bloomquist
(74) *Attorney, Agent, or Firm* — Lorenz & Kopf LLP

(57) ABSTRACT

Methods and systems are provided for automatically correcting escaping functions in a module of page rendering code. The method includes: providing an HTML escaping schema and a script escaping schema; identifying a first character sequence having a first escaping function; determining whether the first character sequence is coded in HTML or coded as a scripted element; correcting the first escaping function using the HTML escaping schema if the first character sequence is coded in HTML; and correcting the first escaping function using the script escaping schema if the first character sequence is coded as a scripted element.

15 Claims, 4 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson et al. |
| 7,636,887 B1 * | 12/2009 | Kinnucan, Jr. ....... G06F 9/4446 715/705 |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,191,038 B1 * | 5/2012 | Samuel ..................... G06F 8/41 717/106 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063414 A1 | 3/2009 | White et al. |
| 2011/0219446 A1 * | 9/2011 | Ichnowski ........... H04L 63/1441 726/22 |
| 2012/0090026 A1 * | 4/2012 | Andrews ............ G06F 17/3089 726/22 |

* cited by examiner

SYSTEM AND METHOD FOR AUTOMATICALLY INSERTING CORRECT ESCAPING FUNCTIONS FOR FIELD REFERENCES IN A MULTI-TENANT COMPUTING ENVIRONMENT

CROSS-REFERENCE TO RELATED APPLICATION

This application claims the benefit of U.S. provisional patent application Ser. No. 61/697,047 filed Sep. 5, 2012, the entire contents of which are incorporated herein by this reference.

TECHNICAL FIELD

Embodiments of the subject matter described herein relate generally to computer systems and applications for protecting against cross-site scripting attacks, and more particularly to the use of a core engine for analyzing a page and fixing up field references to use the correct escaping functions in an on demand environment.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software s between multiple sets of users.

Multi-tenant service providers may offer page rendering applications to their tenants for use in developing web based user interfaces (UIs). Presently known tools for fixing missing or incorrect escaping functions in an HTML context are known. That is, the page rendering application may be configured to wrap a reference with the correct HTML re-encoding function. However, presently known tools do not account for non-HTML encoded elements. Systems and methods are thus needed which overcome these limitations.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for implementing a three-tiered customer support paradigm involving an archival knowledge base, community or peer support, and interaction with a customer support agent (if necessary) seamlessly integrated into a single display feed.

Figure 1:
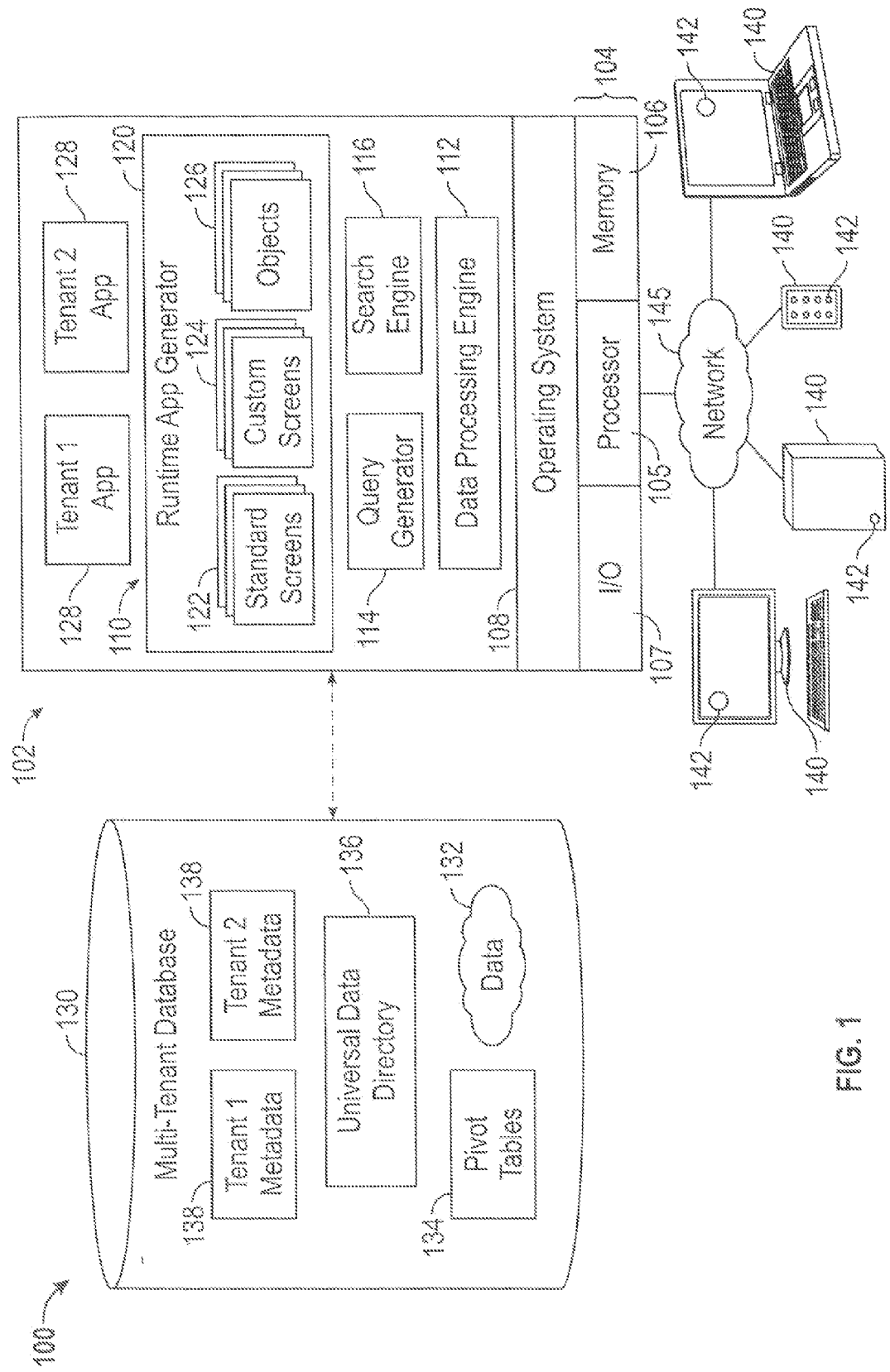
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

In addition to the foregoing "dedicated" syncing clients, the present disclosure also contemplates the automatic sharing of data and files into applications, such as Microsoft Word™, such that saving a document in Word would automatically sync the document to the collaboration cloud. In an embodiment, each client device, application, or web client is suitably configured to run a client application 142, such as the Chatterbox file synchronization module or other application for performing similar functions, as described in greater detail below.

An alternative vector into the automatic syncing and sharing may be implemented by an application protocol interface (API), either in lieu of or in addition to the client application 142. In this way, a developer may create custom applications/interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In various embodiments, virtual application 128 may include tools for checking and fixing page edits. That is, when a user edits a page in an on-demand system, a core engine may be configured to analyze the edited page and fix up the field references so that they use the correct escaping functions for their output contexts. In a preferred embodiment, the field reference output escaping function fixer/checker engine may be integrated into the system's page save path to thereby secure the page by default via a user interface (UI) application protocol interface (API). For example, the automatically added functions and corrections may be highlighted or otherwise presented to the user, whereupon the user may select the recommendations or replace some or all of them with different code.

Application 128 may include a page rendering application, such as, for example, Salesforce's Visualforce™ page rendering technology. Visualforce (or other suitable page rendering application) allows tenants to create HTML-based custom pages with built-in logic using a programmatic controller. The controller may be based on either the JavaServer Faces™ (available at www.java.com) or the Apex™ programming language (available at www.salesforce.com), or any other language having similar functionality, and controls the layout and other visual aspects of the page being rendered. Particularly, the imbedded mark-up language allows references to be made to specific variables (e.g., character sequences) within the controller, and to display the variables on the page.

Often variables which are output to a web page include HTML code which can affect the rendering of the page if not properly encoded. To address this concern, the character string which the developer desires to display may be output encoded to avoid escape functions which may be misinterpreted by web browsers and other clients as an instruction to be executed, rather than as a variable to be displayed. That is, certain characters sought to be displayed, but which include JavaScript code or HTML code which may affect the rendering of the page, are converted to an escape sequence by the controller, and retranslated back into the original expression when displayed by the browser.

As a basic illustrative example, consider the following code (e.g., Apex, Java) input to the controller for prompting a user to enter "any" desired value for the variable Company Name within a web page:

Company Name="any<value>&\"

To avoid the web browser misinterpreting characters as an unintended HTML or XML tag, the controller may parse through each character and determine which characters are safe to render "as is", and which characters need to be output encoded to avoid rendering errors. Thus, the controller may be configured to replace the foregoing code with the following output:

<body>any<value>&</body>

More particularly, assuming HTML entity encoding, the character string "any" is safe to directly render onto the page as is. However, the less than character (<) is not safe to render directly, and thus may be output encoded as the escape function <. Similarly, the greater than character (>) may be re-encoded as the escape function >. Finally, the ampersand character (&) may be converted to &, to avoid the browser misinterpreting the ampersand character (&) as an escape sequence. That is, the code any<value>& may be output encoded as any<value>&. In this way, the controller may correctly render the page to display the Customer Name variable "any".

Figure 2:
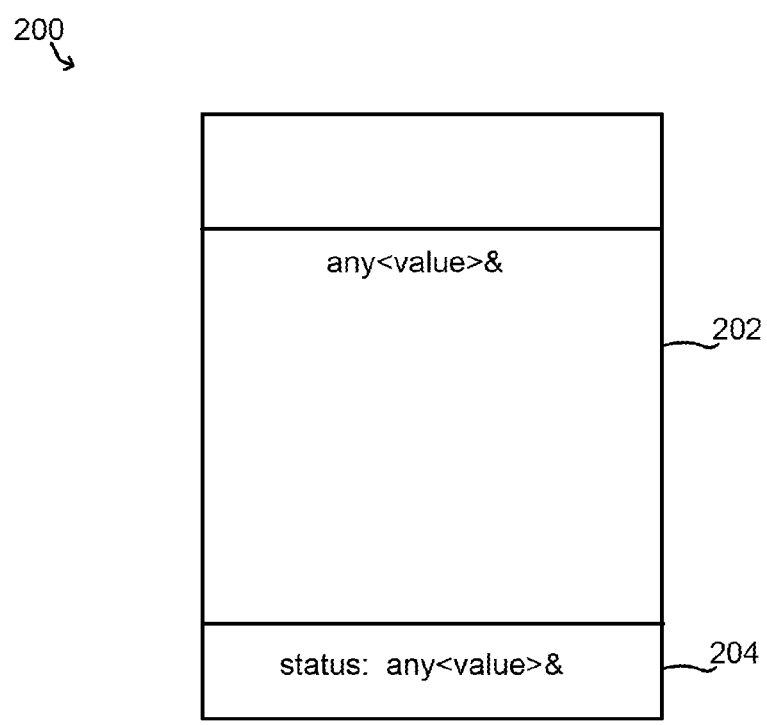
FIG. 2 is a schematic block diagram of an exemplary web browser page showing a status bar correctly rendered in accordance with various embodiments.

In an alternate use case and referring now to FIG. 2, the output encoding may employ a different escaping strategy, depending on the language used to instruct the browser to display the page. For example, when the rendered page 200 includes a script (such as a Java™ script) for displaying a status field within a status bar 204, the controller may be configured to implement Java script escaping for that element. In this regard, consider the following JavaScript instruction for displaying the variable sequence "any<value>&" in the status bar 204 shown in FIG. 2:

<script>window.status='any<value>&"

If the controller simply applies HTML entity encoding as before, page rendering errors could occur because the characters which are appropriate for translation in an HTML regime may not be appropriate for translation in a scripting (e.g., JavaScript) regime. In particular, characters such as apostrophe ('), double apostrophe ("), and ampersand (&) may be interpreted by the browser as being intended to alter the JavaScript code as rendered on the page. Accordingly, in a scripting environment, the foregoing input code may be converted to 'any\<value\>&\"';

In this way, the greater than and less than symbols as well as the single quote following the greater than symbol may all be properly treated as displayed data, rather than as code. Stated another way, the system provides a mechanism across coding languages for treating characters as data, even if the characters to be displayed also have an associated executable function.

In accordance with various embodiments, application 128 may be configured to include any number of translation modules for output encoding any type of code to thereby automatically insert the correct escaping functions in field references, regardless of the coding environment. Moreover, in accordance with an embodiment, the system may be configured to re-encode automatically, but to present the re-encoded instructions to the user for complete or partial approval before finalizing the translation. For example, the translated code could be highlighted or otherwise graphically identified for the user, whereupon the user may be prompted to accept the changes, either globally or individually (e.g., serially).

More generally, the application 128 may include a determination module for determining whether a display element is coded in HTML or JavaScript, and a finite state machine to track the then current output context (e.g., HTML or JavaScript) and to select the appropriate escaping strategy. That is, the state machine may scan each character during a page save operation (e.g., after editing), and sequentially determine whether the then current output context is based on HTML or JavaScript coding. An HTML escaping strategy is employed while the system is in the HTML output context; conversely, a JavaScript escaping strategy (e.g., JSencode) is employed while the system is in the JavaScript output context.

In a further embodiment, the translation module is configured to automatically present the proposed translations to the user when the page is saved. Alternatively, the re-encoding may simply be automatically accepted (i.e., without first prompting the user) upon a page save.

Figure 3:
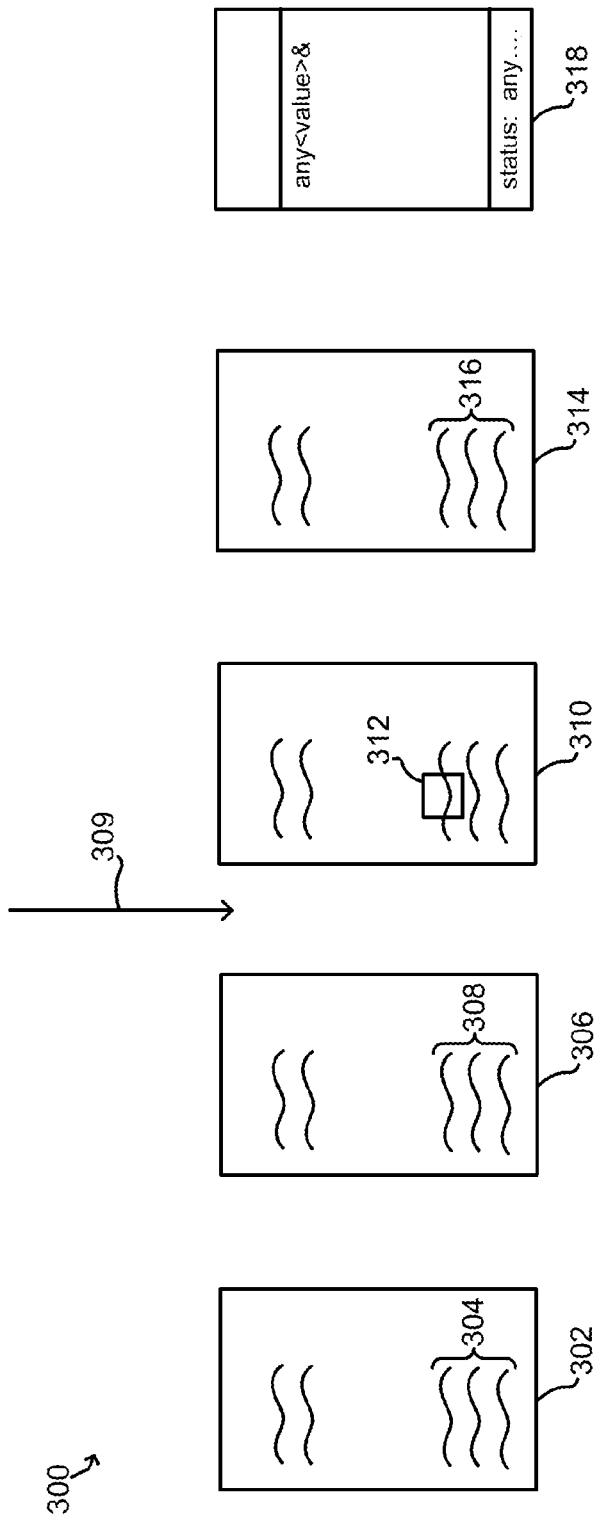
FIG. 3 is a schematic block diagram of an exemplary page editing and saving sequence in accordance with an embodiment.

FIG. 3 is a block diagram of a page editing and saving sequence 300 in accordance with various embodiments. More particularly, the page editing and saving sequence 300 includes a first (UI) 302 including page rendering code 304. A second UI 306 includes edited code 308. Upon a page save request 309 or other triggering event, the output encoded (translated) code 312 is highlighted or otherwise visually identified for the user. The user may then accept, modify, or reject the various highlighted translation segments 312, yielding an accepted version UI 314 including final code 316. The page 318 may then be rendered in accordance with the corrected code.

Figure 4:
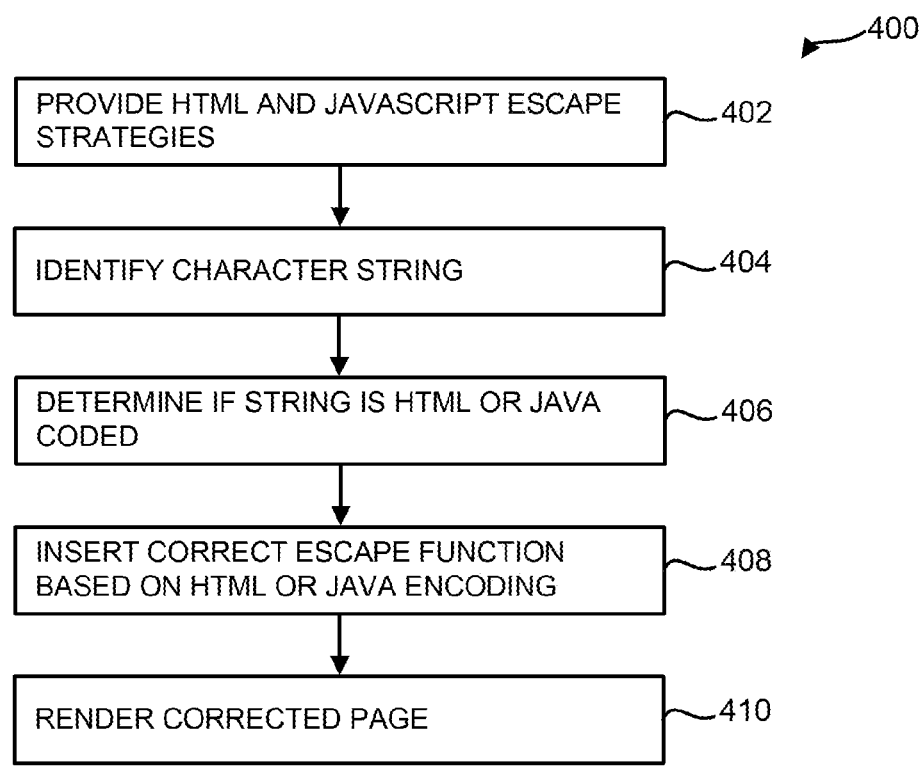
FIG. 4 is a flow diagram of an exemplary method for automatically inserting correct escaping functions into field references in accordance with an embodiment.

FIG. 4 is a flow diagram of an exemplary method 400 for automatically inserting corrected escape functions into field references in accordance with various embodiments. More particularly, the method 400 includes providing (Task 402) HTML and script based escaping strategies, respectively, and identifying (Task 404) a character string for evaluation. The method further includes determining (Task 406) if the string or sequence is encoded using HTML or a scripting approach, and inserting (Task 408) the correct escape function based on the encoding scheme used to encode the string. The corrected page is then rendered (Task 410), for example in a web browser using a multi-tenant server.

Although various embodiments are set forth in the context of a multi-tenant or on-demand environment, the systems and methods described herein are not so limited. For example, the may also be implemented in enterprise, single tenant, and/or stand-alone computing environments.

The following examples further illustrate various embodiments. In general, when a user edits a Visualforce page, or when a Siteforce user edits a custom code block, the system analyzes the page and fixes up all field references to use the correct escaping functions for their output contexts during the save. Field references that intentionally use a different escaping function or no escaping function will be able to bypass this step by identifying selected field references as exempt, for example, by wrapping those field references with a new NOENCODE( ) function.

When a Siteforce component or Visualforce page is saved, the formula field validation code with contextual awareness is run, and the appropriate formula field escaping methods are automatically added to the formula when missing. As an example, <div title="{!myField_c}">hi</div> will get saved and re-displayed to the saving user as

<div title="{!HTMLENCODE(myField_c)}">hi</div>.

Similarly,

<script>window.status='{!myField_c}';</script> would get saved as

<script>window.status='{!JSENCODE(myField_c)}';</script>.

Some analysis of the formula may be required to determine if escaping already exists. For example, in the instruction

```
<script>window.status='{!IF(aField_c > 5,
    myField_c, JSENCODE(otherField_c) & "cats")}';</script>
``` the entire reference could be wrapped around JSENCODE, but the else-branch already has a JSENCODE on the data, and is also concatenated with a 'safe' value. One possible target in this case would be

```
<script>window.status='{!IF(aField_c       >       5,
JSENCODE(myField_c),
    JSENCODE(otherField_c) + "cats")}';</script>,
``` which results from ensuring that all branches are escaped and that string literals, such as "cats", don't include any characters that break out of context.

If a user does not want this automatic escaping applied, then they can specifically wrap it in NOENCODE( ). That can help ensure that users are secure by default and insecure by explicit choice.

A finite state machine may be used to determine the proper output context. JavaScript parsing can help ensure that attack strings are written out properly within the various contexts in JavaScript.

For custom HTML, the default parsing approach may also use the finite state machine, but its effectiveness against first-level attacks, which are those that break out of context with just one unescaping pass by the browser, may be limited. If the data type is HTML, then the system can avoid escaping if the escaping for the field would have been HTMLENCODE, since HTML data generally is intended to get rendered onto the page directly and as-is. If an HTML data field reference is made in another context, such as in a JavaScript string, then the data may be escaped as a JavaScript string.

Secondary attacks, which break out of context after two or more unescaping passes by the browser, remain possible, so users may be provided a way to add escaping for secondary attacks. Specifically, if a user puts data into a JavaScript variable that can then be set as the innerHTML on an element using JavaScript, then the page could still have XSS vulnerabilities. In that example, the correct reference is {!JSENCODE(HTMLENCODE(myField_c))}.

The default escaping function could still be applied from the state machine (for consistent protection against first-level attacks), although in this embodiment the user can allow additional escaping to be applied before the default escaping.

With the use of the HTMLENCODE function, the following could be made safe:

```
document.getElementById('cats').innerHTML=
    "{!HTMLENCODE(myField_c)}";
```

In that example, HTML entity encoding is applied to the myField_c value, and then JavaScript string escaping applied to that, resulting in

```
document.getElementById('cats').innerHTML=
    "{!JSENCODE(HTMLENCODE(myField_c))}";
``` upon being saved. As an additional example:

```
<a
href="javascript:document.getElementById('cats').innerHTML=
    '{!HTMLENCODE(myField_c)}';">hi</a>
``` would apply HTML entity encoding, JavaScript string escaping, and then strict URL encoding, resulting in

```
<a
href="javascript:document.getElementById('cats').innerHTML=
    '{!URLENCODE(JSENCODE(HTMLENCODE(myField_c)))}';
    ">hi</a>.
```

Multiple layers of escaping may be employed to allow them to be performed in one pass instead of two or three. This can enhance security by making references safe by default, regardless of their output context. It makes unintentional XSS more difficult, and users can be advised to be careful when using .innerHTML, or simply avoid the use of assigning .innerHTML entirely in their custom code.

In other embodiments such as storing raw JavaScript code and/or HTML within data, the NOENCODE function can help, such as with <script>{!NOENCODE(myField_c)}<script>. That helps ensure that a reference is are not automatically "fixed" if it was intended to output either as-is or with HTML entity encoding.

In the following exemplary embodiment of a high-level state machine, the context determines how a field reference should be escaped. The goal is to not exit the context of the reference while representing the string, if possible. For most contexts, escaping allows any input string to be rendered onto the page, but some contexts do not allow that, so stripping or remapping may be required in some contexts. An example is

```
<script>function
    hello{!world_c}( ) { alert('hi!'); }</script>,
``` where world_c gets escaped using
TextUtil.makeJavascriptIdentifierSafe,
which maps anything that is not a JavaScript identifier character into an underscore. In the preceding example, if world_c is
</script><h1>haha!</h1><script>//,
then the rendered output is

```
<script>function hello_script_h1_haha_h1_script_( )
    { alert('hi!'); }</script>.
```

A method is thus provided for inserting escaping functions into field references. The method includes: providing a first translation module and a second translation module; identifying a first field reference having a first encoding scheme; identifying a second field reference having a second encoding scheme different from the first encoding scheme; inserting a first escaping function into the first field reference to produce a first edited field reference using the first translation module; and inserting a second escaping function into the second field reference to produce a second edited field reference using the second translation module.

In an embodiment, the method involves rendering a page using the first edited field reference and the second edited field reference, wherein rendering comprises displaying the page in a web browser.

In another embodiment, the first translation module embodies a first escaping strategy having a first set of syntax rules, and the second translation module embodies a second escaping strategy having a second set of syntax rules.

In another embodiment, the first encoding scheme comprises HTML, the first translation module comprises an HTML based entity encoding strategy, the second encoding scheme comprises a scripting language, the second translation module comprises a script based encoding strategy, the scripting language comprises JavaScript, and the script based encoding strategy comprises JSENCODE.

In an embodiment of the method, identifying the first and second field references comprises character-by-character scanning using a finite state machine to determine whether the then current output context, wherein the then current output context is based on one of the first and the second encoding schemes.

In another embodiment, at least one of the first and second field references comprises a sequence of characters to be displayed in a rendered page.

In another embodiment, inserting escaping functions into field references is performed by a server hosting multiple tenants in an on demand computing environment. Alternatively, inserting escaping functions into field references is performed by a processor hosting a single tenant in a stand-alone computing environment.

A method is also provided for automatically correcting escaping functions in a module of page rendering code. The method includes: providing an HTML escaping schema and a script escaping schema; identifying a first character sequence having a first escaping function; determining whether the first character sequence is coded in HTML or coded as a scripted element; correcting the first escaping function using the HTML escaping schema if the first character sequence is coded in HTML; and correcting the first escaping function using the script escaping schema if the first character sequence is coded as a scripted element.

In an embodiment, the method further involves rendering a page in a web browser using the corrected first escaping function.

In another embodiment, determining comprises determining that the first character sequence is coded in JavaScript, and the script escaping schema comprises JSENCODE.

In an embodiment of the method, determining comprises scanning the page rendering code on a character by character basis using a finite state machine to track the current output context of the page rendering code.

Another embodiment involves selecting one of the HTML escaping schema and the script escaping schema based on the output of the finite state machine.

The method may also involve presenting the corrected first escaping function to a user, and prompting the user to accept the corrected first escaping function.

A computer application embodied in a non-transitory medium is also provided for operation by a processing system for performing the steps of: providing an HTML escaping schema and a script escaping schema; identifying a first character sequence having a first escaping function; determining whether the first character sequence is coded in HTML or coded as a scripted element; correcting the first escaping function using the HTML escaping schema if the first character sequence is coded in HTML; and correcting the first escaping function using the script escaping schema if the first character sequence is coded as a scripted element.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of inserting escaping functions into field references by a virtual application on an application platform, the method comprising:
    providing, by the virtual application on the application platform, a first translation module and a second translation module;
    identifying, by the virtual application on the application platform, a first field reference having a first encoding scheme;
    identifying, by the virtual application on the application platform, a second field reference having a second encoding scheme different from the first encoding scheme;
    inserting, by the virtual application on the application platform, a first escaping function into the first field reference to produce a first edited field reference using the first translation module;
    inserting, by the virtual application on the application platform, a second escaping function into the second field reference to produce a second edited field reference using the second translation module;
    presenting the first edited field reference and the second edited field reference to a user for acceptance; and
    saving, upon acceptance by the user, the first edited field reference and the second edited field reference.

2. The method of claim 1, further comprising rendering a page using the first edited field reference and the second edited field reference.

3. The method of claim 2, wherein rendering comprises displaying the page in a web browser.

4. The method of claim 1, wherein the first translation module embodies a first escaping strategy having a first set of syntax rules, and the second translation module embodies a second escaping strategy having a second set of syntax rules.

5. The method of claim 1, wherein the first encoding scheme comprises HTML, and the first translation module comprises an HTML based entity encoding strategy.

6. The method of claim 5, wherein the second encoding scheme comprises a scripting language, and the second translation module comprises a script based encoding strategy.

7. The method of claim 6, wherein the scripting language comprises JavaScript, and the script based encoding strategy comprises JSENCODE.

8. The method of claim 1, wherein identifying the first and second field references comprises character by character scanning.

9. The method of claim 8, wherein scanning comprises using a finite state machine to determine the then current output context.

10. The method of claim 9, wherein the then current output context is based on one of the first and the second encoding schemes.

11. The method of claim 10, wherein at least one of the first and second field references comprise a sequence of characters to be displayed in a rendered page.

12. The method of claim 1, wherein inserting escaping functions into field references is performed by a server hosting multiple tenants in an on demand computing environment.

13. The method of claim 1, wherein inserting escaping functions into field references is performed by a processor hosting a single tenant in a stand-alone computing environment.

14. The method of claim 1, wherein the presenting step includes highlighting the first escaping function in the first edited field reference and the second escaping function in the second edited field reference.

15. The method of claim 1, further comprising initiating the presenting step in response to receiving a save request from the user.

* * * * *